United States Patent
Mengelt

(10) Patent No.: US 7,281,551 B2
(45) Date of Patent: Oct. 16, 2007

(54) DEVICE FOR DRAWING OFF/REFILLING AND BLEEDING BRAKE FLUID

(75) Inventor: Räto Mengelt, Emmenbrücke (CH)

(73) Assignee: Bo Erik Nyberg, Oberageri (CH)

( * ) Notice: Subject to any disclaimer, the term of this patent is extended or adjusted under 35 U.S.C. 154(b) by 102 days.

(21) Appl. No.: 10/533,379

(22) PCT Filed: Sep. 4, 2003

(86) PCT No.: PCT/SE03/01377

§ 371 (c)(1), (2), (4) Date: Nov. 23, 2005

(87) PCT Pub. No.: WO2004/024526

PCT Pub. Date: Mar. 25, 2004

(65) Prior Publication Data

US 2006/0196572 A1 Sep. 7, 2006

(30) Foreign Application Priority Data

Sep. 10, 2002 (SE) .................................... 0202670

(51) Int. Cl.
*B65B 1/04* (2006.01)
(52) U.S. Cl. .......................... 141/98; 141/59; 141/65; 188/352
(58) Field of Classification Search .................... 141/8, 141/59, 65, 95, 98; 188/352; 60/453
See application file for complete search history.

(56) References Cited

U.S. PATENT DOCUMENTS

| 4,165,819 | A | | 8/1979 | Zivkovic | |
|---|---|---|---|---|---|
| 4,415,071 | A | | 11/1983 | Butler et al. | |
| 5,060,703 | A | * | 10/1991 | Koerner | 141/59 |
| 6,179,392 | B1 | | 1/2001 | Baechle et al. | |
| 6,206,055 | B1 | * | 3/2001 | Hollub et al. | 141/98 |
| 6,302,167 | B1 | | 10/2001 | Hollub | |
| 6,796,339 | B1 | * | 9/2004 | Petty | 141/65 |
| 6,929,036 | B2 | * | 8/2005 | Awad | 141/65 |
| 7,004,206 | B2 | * | 2/2006 | Viken et al. | 141/1 |

FOREIGN PATENT DOCUMENTS

| DE | 40 31 098 A1 | 4/1992 |
|---|---|---|
| GB | 2 304 842 A | 3/1997 |
| WO | WO-01/25090 A1 | 4/2001 |

\* cited by examiner

*Primary Examiner*—Timothy L. Maust
(74) *Attorney, Agent, or Firm*—Birch, Stewart, Kolasch & Birch, LLP

(57) ABSTRACT

Device for drawing off hydraulic fluid from a hydraulic brake circuit of a vehicle/refilling the circuit with hydraulic fluid, and bleeding air from hydraulic fluid in the circuit. A pneumatic circuit having line elements from a compressed air connection to a compressed air-driven hydraulic pump, which is coupled into a hydraulic circuit to generate excess pressure and vacuum. A first brake fluid connection for the connection to a brake fluid reservoir or a bleed nipple on any vehicle wheel brake; a second brake fluid connection for drawing off old brake fluid from the brake circuit via the hydraulic circuit; and a third brake fluid connection for supplying fresh brake fluid to the vehicle brake circuit via the hydraulic circuit. A two-way valve, which opens a connection for extracting old brake fluid from the brake fluid reservoir, and opens a connection for refilling the brake fluid reservoir with fresh brake fluid.

12 Claims, 2 Drawing Sheets

DEVICE FOR DRAWING OFF/REFILLING AND BLEEDING BRAKE FLUID

The present invention relates to a device for drawing off hydraulic fluid (i.e. brake fluid) from a hydraulic brake circuit for the wheel brakes of a vehicle/refilling the circuit with hydraulic fluid, and for bleeding air from hydraulic fluid in the brake circuit.

PRIOR ART

Apparatuses for the treatment of brake fluid for hydraulic brake systems in vehicles are already known. Examples of these include U.S. Pat. No. 5,497,864, which demonstrates and describes an apparatus for drawing off brake fluid from a brake cylinder forming part of a vehicle brake system and an associated device by means of which the system can be refilled with fresh brake fluid to replace that which has been drawn off.

As a further example, U.S. Pat. No. 5,060,703 describes an apparatus for filling a vehicle hydraulic brake system with brake fluid. The brake fluid tank that is to be filled is under a vacuum and the pump to be used is driven by pressurized brake fluid.

Both of these, however, relate to known designs which can only be used for special functions in servicing and maintaining hydraulic brake systems.

OBJECT OF THE INVENTION

The object of the present invention is to provide a new type of versatile device for the treatment of brake fluid for/in vehicle hydraulic brake systems. The device must lend itself both to drawing off/extracting old brake fluid from the brake system, and to refilling the brake system with fresh brake fluid, and, in addition, to effective bleeding of air from brake fluid in the system.

Further objects of the invention include the facility for use with both pressure bleeding and vacuum bleeding. It must furthermore be possible to use the device for effective servicing and workshop maintenance both of conventional hydraulic brake systems and more recent types of advanced antilock brake systems (ABS brakes). The device must also be designed so that it affords full environmental safety in the handling both of the brake fluid drawn off and of that going into the brake system.

The device must furthermore have the facility for use without power supply and be easily moveable in the premises where it is being used, this being achieved, for example, in that it can be provided with wheels or easily mounted/placed on a rolling chassis. The device must also be easily useable and capable of operation by just one person (one-man operation).

SUMMARY OF THE INVENTION

According to the invention, the aforementioned objects are achieved in that the device has the characteristic features specified in claim 1.

The novelty and distinctive character of the invention primarily reside in the fact that the device comprises a pneumatic circuit having line elements which extend from a compressed air connection to a compressed air-driven element, which is coupled into a hydraulic circuit forming part of the device. The compressed air-driven element is preferably a compressed air-driven hydraulic pump, which is used to generate both excess pressure and vacuum in the hydraulic circuit of the device. This hydraulic circuit is provided with a first brake fluid connection for the connection either of a brake fluid reservoir forming part of the brake circuit of the vehicle in question, or of a bleed nipple on any of the vehicle wheel brakes.

The device furthermore comprises a second brake fluid connection for drawing off old brake fluid from the vehicle brake circuit via the hydraulic circuit of the device and a third brake fluid connection for supplying fresh brake fluid to the vehicle brake circuit via the hydraulic circuit of the device. This hydraulic circuit comprises a manually adjustable two-way valve, which in one position opens a connection for extracting old brake fluid from the brake fluid reservoir, and in its other position opens a connection for refilling the brake fluid reservoir with fresh brake fluid.

With a device of this type it is possible to rapidly and easily draw off old brake fluid from the brake system and to refill it with fresh brake fluid, and then both to pressure-bleed and vacuum-bleed the brake system.

A significant advantage of the device according to the invention is also that it is powered by purely pneumatic means and therefore only needs to be connected to a compressed air supply system, which in practice is always available in a service or maintenance workshop.

For functional and manufacturing reasons the device may also suitably be provided with the further characteristics specified in the dependent Claims 2 to 6.

The invention will now be further explained and illustrated through reference to examples of embodiment shown in the drawings attached.

DESCRIPTION OF EXAMPLES OF EMBODIMENT

Figure 1:
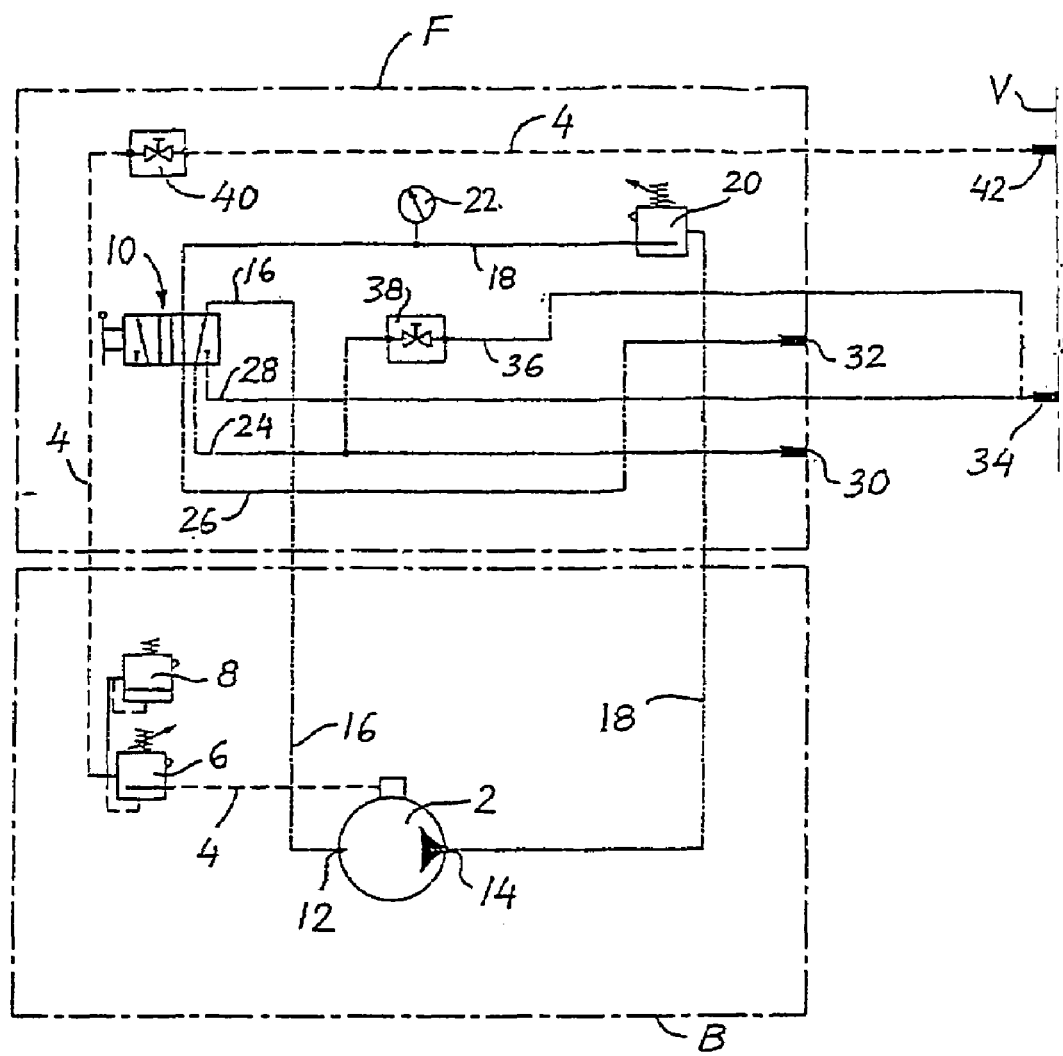
FIG. 1 shows a schematic coupling diagram of the pneumatic and hydraulic circuits in one embodiment of a device according to the invention.

For the sake of simplicity, FIG. 1 in one and the same schematic diagram shows the components and line system layout for the pneumatic circuit and hydraulic circuit forming part of a device according to the invention.

Shown in the lower dashed rectangle denoted by B in FIG. 1 are the main pneumatic components fitted on the bottom of the apparatus housing of the device, that is to say a compressed air-driven hydraulic pump 2 and a pressure regulator 6 with an associated pressure-relief valve 8 coupled into the compressed air drive line 4 to the pump.

Shown in the upper dashed rectangle denoted by F in FIG. 1 are the main hydraulic components located inside the apparatus, inside the preferably obliquely inclined front face of the housing, that is to say a manually adjustable two-way valve 10 having five connections, of which the two upper ones (in the figure) are connected to a suction-side inlet 12 and a pressure-side outlet 14 of the hydraulic pump 2 by way of lines 16 and 18 respectively. Also coupled into the line 18 are a pressure regulator 20 and a pressure gauge 22. The three lower connections of the 5/2 valve 10 are connected via lines 24, 26, 28 to a first brake fluid connection 30, a second brake fluid connection 32 and a third brake fluid connection 34. Between the lines 24 and 28 there is furthermore a connecting line 36 to a manual shut-off valve 38, and in the compressed air drive line 4 there is also a manual shut-off valve 40. On what is notionally the rear wall of the apparatus housing denoted by V there is furthermore a main connection 42 for connecting the apparatus/the device to an external compressed air system on the premises where the apparatus is in use.

The first brake fluid connection 30 is used to connect the device either to a brake fluid reservoir (expansion vessel) forming part of the vehicle hydraulic system, or to a bleed nipple on that cylinder of the vehicle wheel brake cylinders that is to be bled. The second brake fluid connection 32 is used when the device is to be connected to a collecting vessel for drawing off old brake fluid from the brake system of the vehicle in question. The third brake fluid connection 34 is used to connect the device to a container with fresh brake fluid with which the vehicle brake system is to be refilled in order to replace old brake fluid that has been drawn off therefrom.

The function and practical use of the device will now be briefly described with reference to the embodiment shown in FIG. 1.

Figure 2:
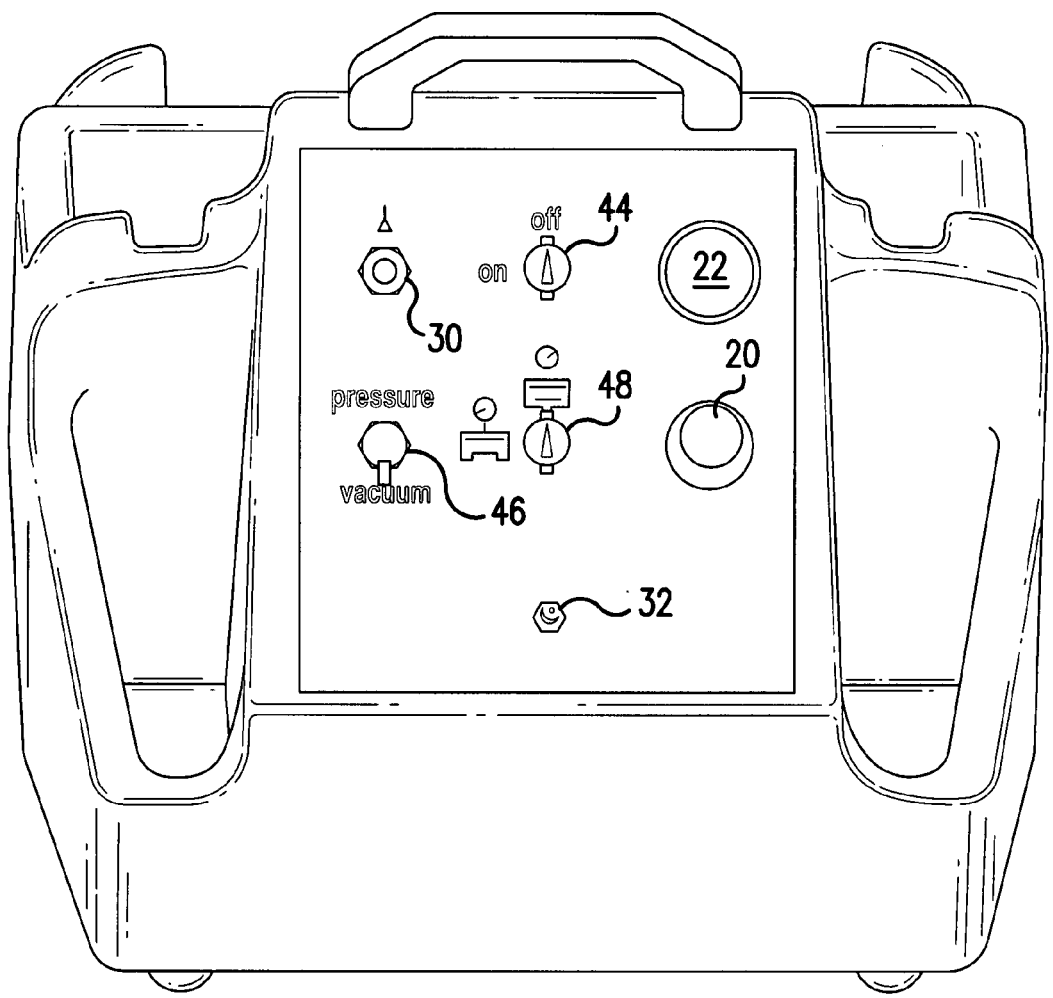
FIG. 2 shows the front view of an example of an apparatus housing for a device according to the invention.

The device is made ready for use by coupling a suction hose between the connection 34 and said container containing fresh brake fluid. The device must then be switched off by setting a selector switch 44 (see FIG. 2) to the Off position. The external compressed air system is then connected to the connection 42.

The device is then usually first used to extract old brake fluid out of the brake fluid reservoir of the vehicle in question by means of a vacuum. The brake fluid collecting vessel is then connected via a hose to the connection 32, following which the brake fluid reservoir is connected to the connection 30. The pressure/vacuum selector switch 46(=the 5/2 valve 10) is set (see FIG. 2) to the Vacuum position (that is to say the valve 10 is in the position shown in FIG. 1), and the system selector switch 48 is set to the System Close position, and the selector switch 44 to the On position. Old brake fluid is then extracted from the brake fluid reservoir, following which the selector switch is set to the Off position.

The next step in using the device is to refill the brake fluid reservoir with fresh brake fluid. The selector switch 46 is set to the Pressure position, that is to say the valve 10 is switched to the right from the position shown in FIG. 1. The selector switch 44 is set to the On position, and the brake fluid reservoir is refilled via a filling hose from the connection 30. When refilling is completed, the device is uncoupled from the brake fluid reservoir and the selector switch 44 is set to the Off position, following which the selector switch 48 is set to the System Relief position.

The next step in using the device is now to pressure-bleed the vehicle brake system. To do this, a suitable adapter has to be screwed pressure-tight on to the brake fluid reservoir filling connection, following which a hose is connected between the adapter and the connection 30. The selector switch 46 is set to the Pressure position, and the selector switch 48 is set to the System Close position, whilst the selector switch 44 is set to the On position. The required brake fluid pressure is set by means of the regulator 20, and the brake fluid collecting vessel is connected via a hose to the bleed nipple on the brake cylinder of the wheel in question, following which the nipple is opened and brake fluid is drawn off for bleeding purposes, all in accordance with the vehicle manufacturer's service specifications. The bleeding procedure is then repeated for the other vehicle wheels or brake cylinders in turn. When bleeding of all the wheel brake cylinders is completed, the selector switch 44 is set to the Off position, and the selector switch 48 is set to the System Relief position, following which the hose between the adapter and the connection 30 is removed and the adapter is unscrewed from the brake fluid reservoir, which is then sealed with its usual sealing cap.

Finally, the device is used for vacuum bleeding of the vehicle brake system. In preparation for this, a separate brake fluid filling device is fitted to the filling connection of the brake fluid reservoir, and a bleed hose is connected to the connection 30, whereupon the brake fluid collecting vessel is connected to the connection 32. The selector switch 46 is set to the Vacuum position, and the selector switch 48 to the System Close position, following which the other end of the bleed hose is connected to the bleed nipple in question. The selector switch 44 is set to the On position and the brake cylinder is bled according to the manufacturer's instructions. The vacuum bleeding procedure is then repeated in the same way for the brake cylinders of the other wheels, following which the selector switch 44 is set to the Off position, and the brake fluid filling device is detached from the brake fluid reservoir, which is then sealed with its usual cap.

The invention claimed is:

1. Device for drawing off hydraulic fluid from a hydraulic brake circuit for the wheel brakes of a vehicle/refilling the circuit with hydraulic fluid, and for bleeding air out of hydraulic fluid in the brake circuit, characterized by a pneumatic circuit having line elements (4) from a compressed air connection (42) to a compressed air-driven element (2), which is coupled into a hydraulic circuit forming part of the device and which serves to generate both excess pressure and vacuum in the hydraulic circuit of the device, this hydraulic circuit being provided with a first brake fluid connection (30) for the connection either of a brake fluid reservoir forming part of the brake circuit of the vehicle in question, or of a bleed nipple on any of the vehicle wheel brakes; a second brake fluid connection (32) for drawing off old brake fluid from the brake circuit via the hydraulic circuit of the device; a third brake fluid connection (34) for supplying fresh brake fluid to the vehicle brake circuit via the hydraulic circuit of the device, the hydraulic circuit comprising a manually adjustable two-way valve (10), which in one position opens a connection for extracting old brake fluid from the brake fluid reservoir, and in its other position opens a connection for refilling the brake fluid reservoir with fresh brake fluid.

2. Device according to claim 1, characterized in that the pneumatic circuit line element (4) from the compressed air connection (42) to the compressed air-driven element (2) comprises a manual shut-off valve (40), such as a ball valve, and a pressure regulator (6) provided with a pressure relief valve (8).

3. Device according to claim 1, characterized in that the hydraulic circuit two-way valve (10) is a 5/2 valve, the compressed air-driven element being a hydraulic pump (2), the suction side (12) and pressure side (14) of which are each connected (16 and 18 respectively) to a separate connection on one side of the two-way valve, whilst the three connections on the opposite side of the valve (10) are each connected (24,26 and 28) to three separate brake fluid connections (30,32 and 34 respectively) of the hydraulic circuit.

4. Device according to claim 3, characterized in that the connection (18) between the pressure side (14) of the pump (2) and the 5/2 valve (10) comprises a pressure regulator (20) and a pressure gauge (22).

5. Device according to claim 3, characterized in that a manual shut-off valve (38) is inserted between the connection (28) between the third brake fluid connection (34) and the 5/2 valve (10) on one side, and the connection (24) between the first brake fluid connection (30) and the 5/2 valve (10) on the other side.

6. Device according to claim 1, characterized in that the compressed-air driven element (2) is a diaphragm pump or double diaphragm pump.

7. Device according to claim 2, characterized in that the hydraulic circuit two-way valve (10) is a 5/2 valve, the compressed air-driven element being a hydraulic pump (2), the suction side (12) and pressure side (14) of which are each connected (16 and 18 respectively) to a separate connection on one side of the two-way valve, whilst the three connections on the opposite side of the valve (10) are each connected (24,26 and 28) to three separate brake fluid connections (30,32 and 34 respectively) of the hydraulic circuit.

8. Device according to claim 4, characterized in that a manual shut-off valve (38) is inserted between the connection (28) between the third brake fluid connection (34) and the 5/2 valve (10) on one side, and the connection (24) between the first brake fluid connection (30) and the 5/2 valve (10) on the other side.

9. Device according to claim 2, characterized in that the compressed-air driven element (2) is a diaphragm pump or double diaphragm pump.

10. Device according to claim 3, characterized in that the compressed-air driven element (2) is a diaphragm pump or double diaphragm pump.

11. Device according to claim 4, characterized in that the compressed-air driven element (2) is a diaphragm pump or double diaphragm pump.

12. Device according to claim 5, characterized in that the compressed-air driven element (2) is a diaphragm pump or double diaphragm pump.

* * * * *